United States Patent
Noma et al.

(10) Patent No.: US 7,082,158 B2
(45) Date of Patent: Jul. 25, 2006

(54) ADSL MODEM APPARATUS

(75) Inventors: Nobuhiko Noma, Yokohama (JP); Keiichi Tomita, Yokohama (JP); Tatsuo Imai, Chigasaki (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 892 days.

(21) Appl. No.: 10/128,566

(22) Filed: Apr. 24, 2002

(65) Prior Publication Data

US 2003/0048835 A1 Mar. 13, 2003

(30) Foreign Application Priority Data

Sep. 12, 2001 (JP) ............................ P2001-276698

(51) Int. Cl.
*H04B 1/38* (2006.01)
(52) U.S. Cl. .................................................. 375/222
(58) Field of Classification Search ................ 375/219, 375/220, 221, 222, 224, 225, 260
See application file for complete search history.

(56) References Cited

U.S. PATENT DOCUMENTS

| 6,498,808 B1* | 12/2002 | Tzannes ..................... 375/225 |
| 6,888,884 B1* | 5/2005 | Benayoun et al. .......... 375/222 |
| 2003/0053530 A1 | 3/2003 | Noma et al. |
| 2005/0053124 A1* | 3/2005 | Eichrodt et al. ............ 375/224 |
| 2005/0238091 A1* | 10/2005 | Tzannes ..................... 375/222 |

* cited by examiner

*Primary Examiner*—Emmanuel Bayard

(74) *Attorney, Agent, or Firm*—Greenblum & Bernstein, P.L.C.

(57) ABSTRACT

A control monitors communication status during a data communication and determines a re-initialization is necessary in the current communication status. If the re-initialization is necessary, a pre-selected sub-carrier topology is inverted to request the re-initialization to an ADSL modem apparatus, which is installed by a central system. Upon receiving a reply to the re-initialization request from the ADSL modem apparatus, the re-initialization is performed after an expiration of a predetermined time period.

8 Claims, 9 Drawing Sheets

ADSL MODEM APPARATUS

BACKGROUND OF THE INVENTION

1. Field of the Invention

This invention relates to an ADSL (Asymmetric Digital Subscriber Line) modem apparatus that performs communications using multiple carriers, and a re-initializing method for the ADSL modem.

2. Description of Related Art

In order to perform a communication using an ADSL communication control apparatus (hereafter referred to as ADSL modem), the communication must adheres to the G.992.1 (G.DMT) standard set by ITU-T. In this standard, the DMT (Discrete Multi Tone) method is employed as a modulation/demodulation method for ADSL modems. DMT method is a multi-carrier modulation/demodulation technique that uses multiple carriers with different frequencies.

Upon starting a data communication, an ADSL modem performs an initialization with an ADSL modem in a reception side, in order to determine sub-carrier to be used for the data communication among sub-carriers configuring multicarrier. Further, the ADSL modem determines data amount to be allocated into each sub-carrier. The data communication is performed according to this initialization setting. Accordingly, the data communication is achieved in accordance with communication status at the time the data communication has begun.

When it becomes difficult to maintain the current communication with the communication status because of a line abnormality or the like during data communication, the ADSL modem that has detected the communication difficulty requests the other ADSL modem for a re-initialization. Then, the data communication resumes according to the re-set setting based on the re-initialization.

However, the above-described ADSL modem performs a re-initialization only after an adverse communication status is detected, a condition that makes it difficult to maintain the current communication, and resumes the data communication after the re-initialization. Therefore, a data communication will be performed according to the initialization setting when the communication begins, and continues until an adverse communication status is detected, a condition that makes it difficult to maintain the current communication. For example, even when the communication status improves after the data communication has started, the data communication is still being performed according to the initialization setting at the time the communication began. Thus, the data communication is not performed according to the most recent change in communication status that has occurred after the data communication began.

SUMMARY OF THE INVENTION

This invention is provided to address the above-described problems. The object of the invention is to provide an ADSL modem apparatus and its re-initialization method that is able to perform data communication according to the most recent change in the communication status that has occurred after the data communication began.

This invention selects one of the multi-carrier configuring sub-carriers as a re-initialization control sub-carrier, which is utilized to perform re-initialization control.

According to this invention, re-initialization control is performed using one of the multi-carrier configuring sub-carrier. By monitoring the sub-carrier for the re-initialization control, re-initialization control is performed even after the data communication has started, thereby setting the communication conditions and performing the data communication according to the most recent change in the communication status that has occurred after the data communication began.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The present embodiment is explained in the following, in reference to the above-described drawings.

FIRST EMBODIMENT

Figure 1:
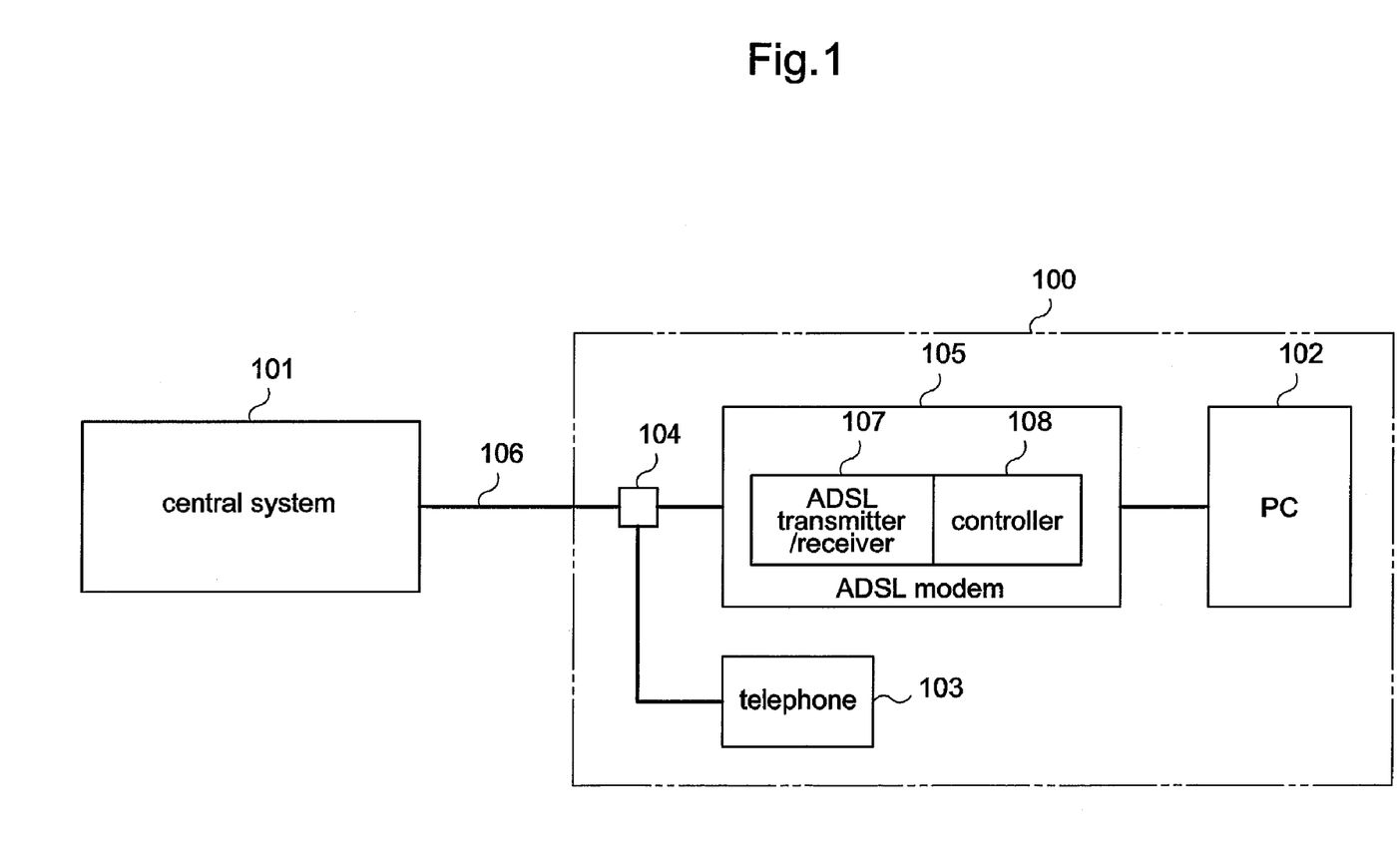
FIG. 1 illustrates a connection between a communication terminal apparatus to which an ADSL modem is installed and a central system according to the first embodiment of the present invention.

FIG. 1 illustrates a connection between communication terminal apparatus 100 to which an ADSL communication control apparatus (ADSL modem) is installed and central system 101 according to the first embodiment of the present invention. In FIG. 1, the ADSL modem according to the embodiment is shown only at communication terminal apparatus 100, however, central system 101 also installs an ADSL modem according to the present embodiment.

As shown in FIG. 1, communication terminal apparatus 100 includes personal computer (PC) 102 and telephone 103. These PC 102 and telephone 103 are connected to splitter 104. In particular, PC 102 is connected to splitter 104 via ADSL modem 105 according to the present embodiment. Data transmitted from central system 101 is input in splitter 104 via communication line 106 configured with a metal cable. Splitter 104 divides the data into voice data (low frequency) used by telephone 103 and data (high frequency) used by PC 102.

Splitter 104 and ADSL modem 105 are separate configurations in this embodiment, however, ADSL modem 105 can be installed within splitter 104. Additionally, splitter 104 is not necessary in situation where the ADSL is singly used without a telephone service.

ADSL modem 105 is configured with ADSL transmitter/receiver 107 and controller 108. ADSL transmitter/receiver 107 performs later-described processes such as modulation/demodulation of data to/from central system 101, under the control of controller 108.

Controller 108 controls the entire ADSL modem 105 including ADSL transmitter/receiver 107. Specifically, controller 108 performs the process described later in FIG. 7. That is, controller 108 performs processes as a monitor unit to monitor the communication status after starting a data communication; determination unit to determine whether current communication status needs re-initialization, re-initialization request unit to request the partner ADSL modem for a re-initialization by inverting predetermined sub-carrier topology when a re-initialization is needed; and re-initialization execution unit to execute a re-initialization after an expiration of a predetermined time period, upon receiving a reply to the re-initialization request from the partner ADSL modem apparatus.

Central system 101 is installed at a telephone office. As described above, central system 101 also includes ADSL modem 105 according to the present embodiment. Central system 101 transmits the voice data from telephone 103 of communication terminal apparatus 100 to the public telephone network using a telephone switchboard, and transmits data from PC 102 to the Internet using a built-in router. ADSL modem 105 at central system 101 is hereafter referred to as Center Side, and ADSL modem 105 at communication terminal apparatus 100 is referred to as Remote Side.

Figure 2:
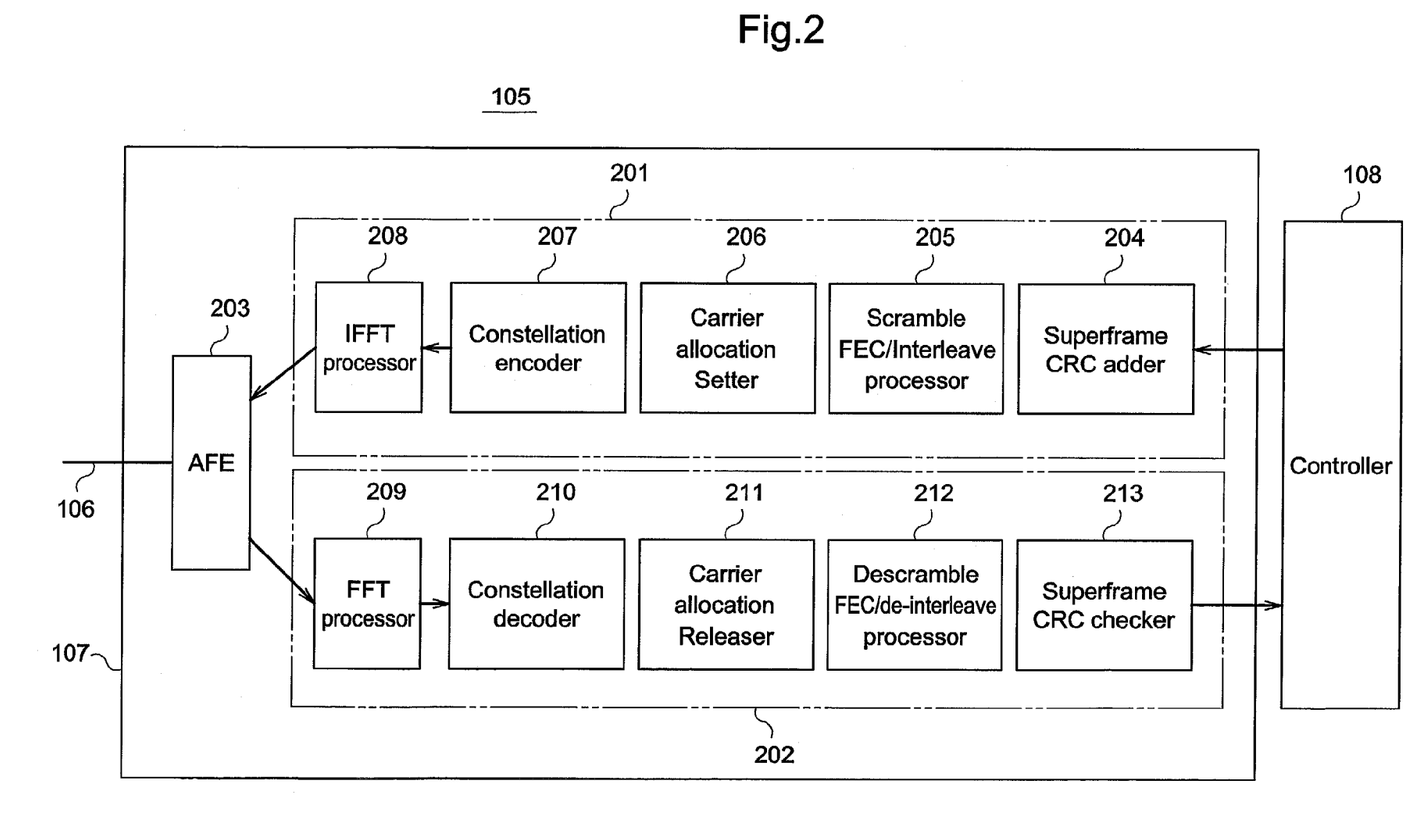
FIG. 2 is a block diagram illustrating the configuration of the ADSL modem according to the first embodiment of the present invention.

FIG. 2 illustrates the configuration of ADSL modem 105 according to the present embodiment. As shown in FIG. 2, ADSL transmitter/receiver 107 is configured with transmission section 201 performing processes for modulating transmission data delivered from controller 108; reception section 202 performing processes for demodulating received data received via communication line 106; and analog front end (AFE) 203 performing analog/digital (A/D) or digital/analog (D/A) conversions between transmission section 201 and reception section 202.

As shown in FIG. 2, transmission section 201 is configured with super frame CRC adder 204, scramble/FEC/interleave processor 205, carrier allocation setter 206, constellation encoder 207, and IFFT (Inverse Fast Fourier Transform) processor 208.

Super frame CRC adder 204 adds super frame CRC to the transmission data delivered from PC 102 via controller 108. Scramble/FEC/interleave processor 205 performs a scramble process that prevents data recognition errors of a receiver ADSL modem, an FEC and interleave processes that enable the error detection and correction when data is reproduced at the receiver ADSL modem.

Carrier allocation setter 206 allocates data amount for each sub-carrier in transmission data after processes such as the scramble process is performed. Constellation encoder 207 converts bit data transmitted by each sub-carrier into coordinate data on an I-Q plane. IEFT processor 208 performs a reverse Fourier conversion process on the coordinate data determined by constellation encoder 207, and outputs the data to AFE 203.

Reception section 202, on the other hand, releases the process that transmission section 201 performed on the transmission data. The reception section 202 is configured with FFT (Fast Fourier Transform) processor 209, constellation decoder 210, carrier allocation releaser 211, de-scramble/FEC/de-interleave processor 212, and super frame CRC checker 213.

FFT processor 209 performs a Fourier conversion process to a received data input via communication line 106 and AFE 203, and obtains coordinate data on the I-Q plane. Constellation decoder 210 converts the coordinate data obtained by FFT processor 209 into bit data. Carrier allocation releaser 211 releases data amount allocation for each sub-carrier in received data that is determined by constellation decoder 210.

De-scramble/FEC/de-interleave processor 212 performs de-scramble/FEC/de-interleave processes on the received data released from data amount allocation for sub-carriers, and releases the scramble/FEC/interleave processes performed at transmission section 201. Super frame CRC checker 213 checks the super frame CRC added to the received data after processes such as the de-scramble process, and outputs the data to controller 108.

All components of transmission section 201 and reception section 202 do not perform their processes at the same time during a data communication. Appropriate component selected by controller 108 performs its part for each scene during the data communication.

ADSL modem 105 according to the present embodiment with the above-described configuration, monitors eye pattern conditions and energy loss detected from the received data of partner ADSL modem 105, and determines whether a re-initialization is needed. If it is needed, a re-initialization is performed to reset the communication conditions of a data communication so that data communication is performed according to the most current change in the communication status that has occurred after the data communication is started.

Figure 3:
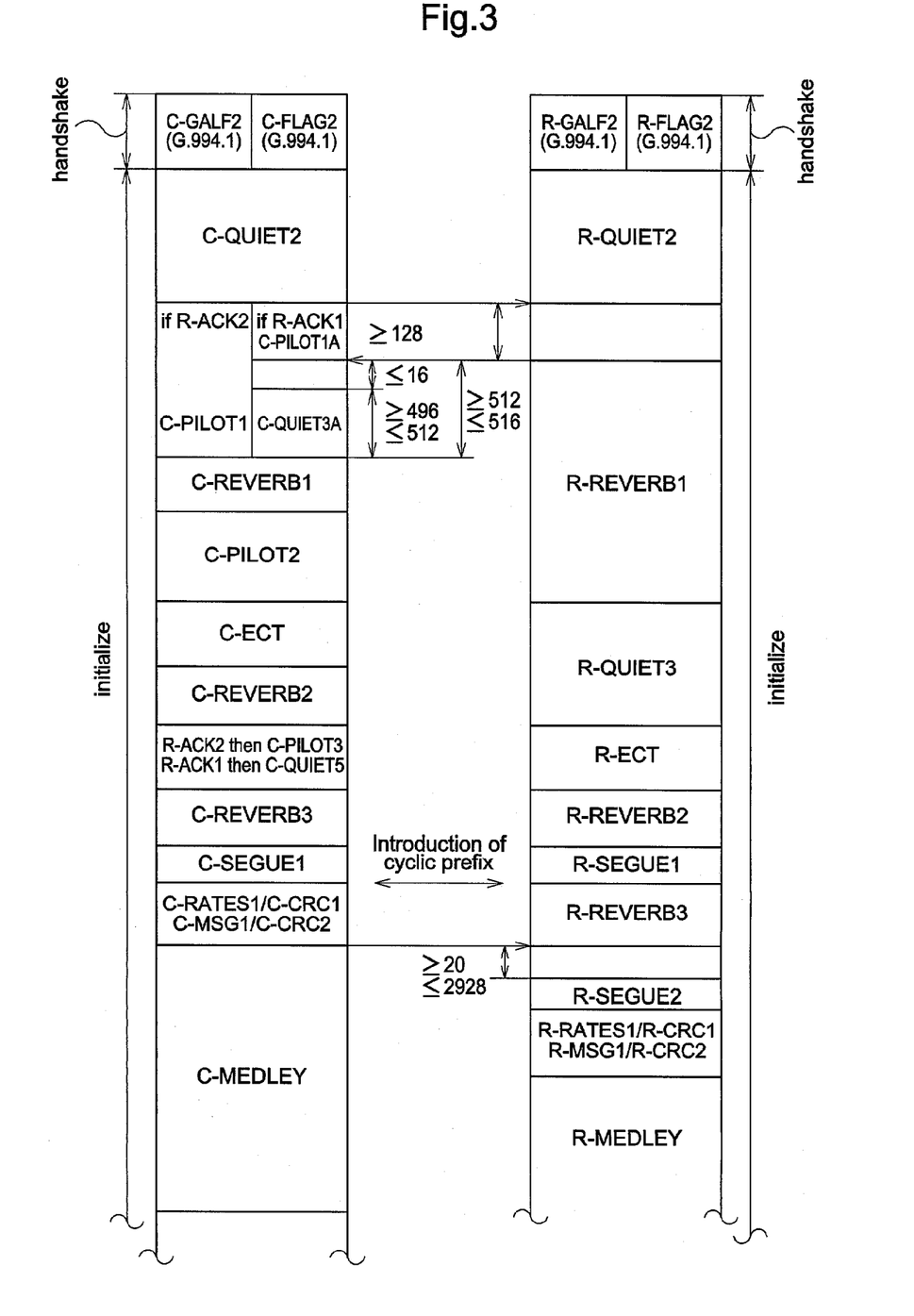
FIG. 3 is a timing chart of an initial sequence of the G.992.1 standard according to the ITU-T.
Figure 4:
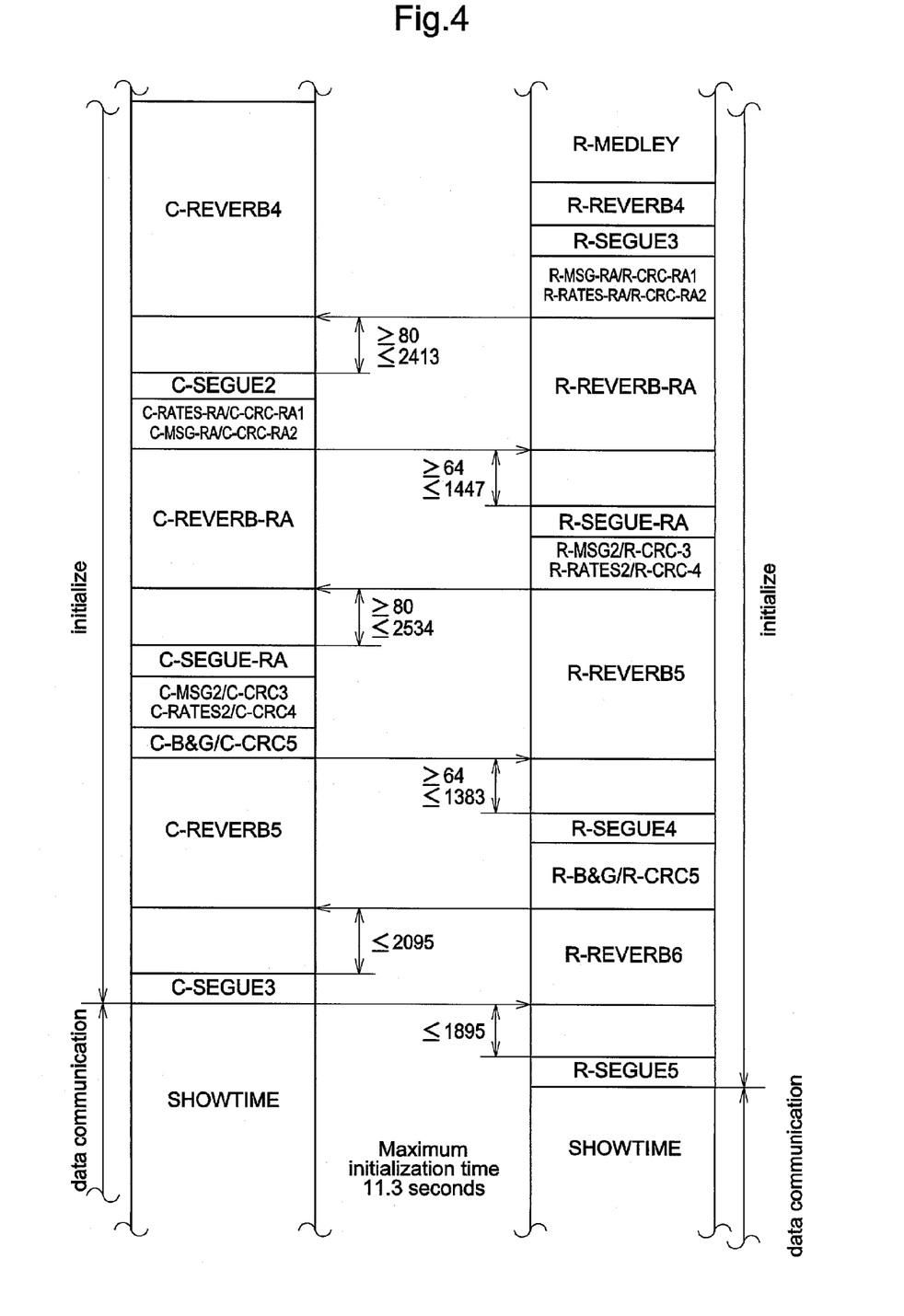
FIG. 4 is a timing chart of an initial sequence of the G.992.1 standard according to the ITU-T.

The operation of ADSL modem 105 according to the present embodiment is explained below. However, a sequence to which ADSL modem 105 adheres for starting data communication is illustrated using FIGS. 3 and 4, prior to the explanation of the operation. FIGS. 3 and 4 illustrate a timing chart of an initial sequence of the G.992.1 standard according to the ITU-T. In FIGS. 3 and 4, the timing chart of Center Side is illustrated at the left, and the timing chart of Remote Side is illustrated at the right.

As shown in FIGS. 3 and 4, upon starting a data communication, Center and Remote Sides perform a handshake and initialization processes prior to an actual data communication.

During the handshake process, information such as identifying information and installed function is exchanged between each other. Upon performing the handshake, ADSL modem 105 of the present embodiment exchanges information such as functional information that the modem is installed with later-described re-initialization function.

During the initialization process, communication conditions such as transmission speed for the upcoming data communication, additive information such as sub-carriers used for the data communication, and data amount (bit number) allocated to each sub-carrier for the actual data communication are set.

More specifically, using "C-RATES1", "C-RATES-RA", and "C-RATES2" from Center Side, and "R-RATES 1", "R-RATES-RA", and "R-RATES2" from Remote Side, desired transmission speed is exchanged between each other.

"C-B&G" transmitted from Center Side and "R-B&G" transmitted from Remote Side set the final transmission speed.

Furthermore, using "C-MSG1", "C-MSG-RA", and "C-MSG2" from Center Side, and "R-MSG1", "R-MSG-RA", and "R-MSG2" from Remote Side, additive information such as sub-carriers that are not used and data amount (bit number) allocated to each sub-carrier during the actual data communication are exchanged. "C-B&G" transmitted for Center Side and "R-B&G" transmitted from Remote Side set the final additive information.

As for "C-RATES2" and "R-RATES2", and "C-MSG2" and "R-MSG2", parameter for communication conditions are determined after exchanging "C-MEDLEY" from Center Side and "R-MEDLEY" from Remote Side.

Upon completing the handshake and initialization processes, actual data communication is performed between Center and Remote Sides, using "SHOWTIME".

As described above, ADSL modem 105 according to the present embodiment determines the need for a re-initialization by monitoring the eye pattern conditions that are detected from the received data from the partner ADSL modem 105. If there is a need for a re-initialization, the communication conditions for the data communication is reset by the re-initialization, and data communication is performed according to the most recent change in communication status that has occurred after the data communication started. Especially, ADSL modem 105 according to the present invention is characterized by that both Center and Remote Sides recognize the need for a re-initialization.

Specifically, ADSL modem 105 according to the present embodiment maintains the sub-carrier topologies and transmit data between Remote and Center sides, without inverting certain sub-carrier topologies, during a normal data communication (when the re-initialization is not necessary). If the re-initialization is needed, however, Center or Remote Side inverts a specific carrier topology and transmits the same in order to request the re-initialization. Then, in response to this re-initialization request, the other side replies by inverting a specific sub-carrier topology so that both sides recognize the need for re-initialization.

Figure 5:
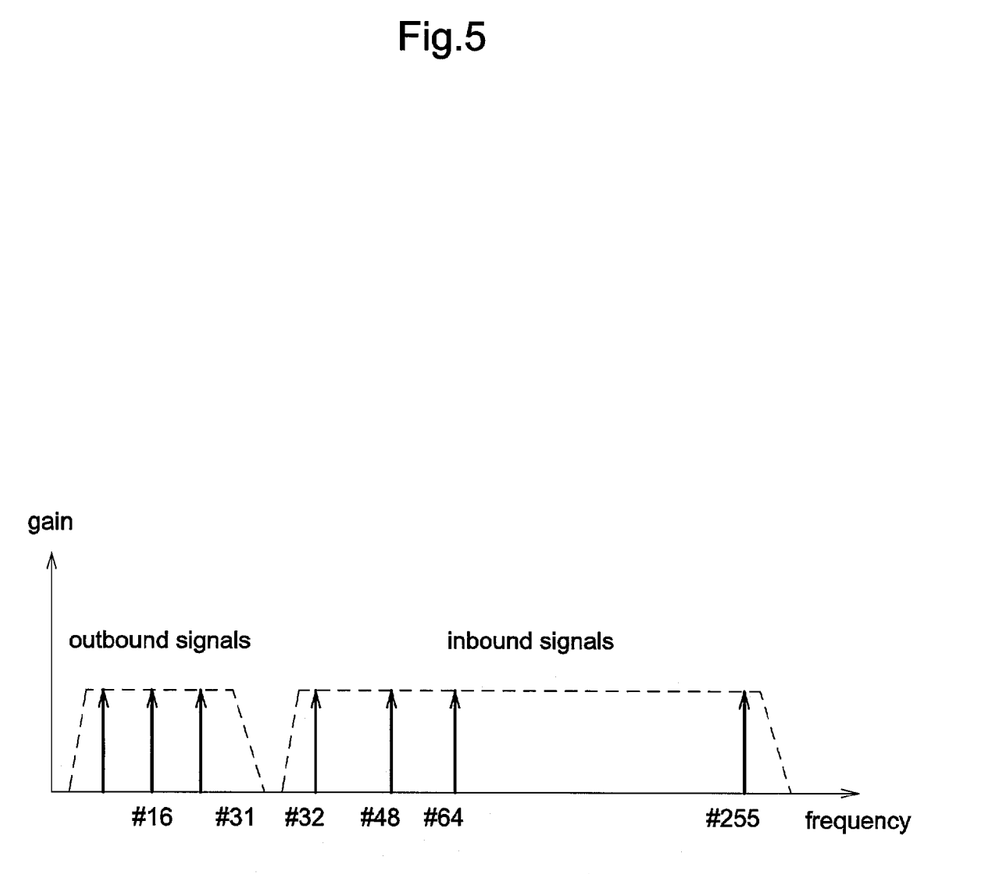
FIG. 5 illustrates specific carriers of the ADSL modem according to the first embodiment of the present invention.

FIG. 5 is used to illustrate specific carriers of ADSL modem 105 according to the first embodiment. FIG. 5 illustrates specific carriers of ADSL modem 105 according to the first embodiment. In FIG. 5, the lateral axis is frequency (f/KHz) and the vertical axis is energy amount (G/db).

As shown in FIG. 5, ADSL modem 105 employs multiple sub-carriers with different frequencies for data communication. Specifically, multiple (255) sub-carriers aligned at every 4.3125 KHz, starting from 25 KHz to 1,104 KHz, are used for the data communication. For convenience of explanation, these multiple sub-carriers have indexes from #1 to #255 (carrier indexes) in this embodiment.

Sub-carriers with carrier indexes #1 to #31 are used for the data communication from Remote Side to Center Side (inbound signals), and sub-carriers with carrier indexes #32 to #255 are used for the data communication from Center Side to Remote Side (outbound signals).

In this embodiment, the sub-carrier of carrier index #16 is selected as a specific sub-carrier to request a re-initialization among the sub-carriers for inbound signals. Similarly, the sub-carrier of carrier index #48 is selected as a specific sub-carrier to reply to the re-initialization request among the sub-carriers for outbound signals.

Figure 6:
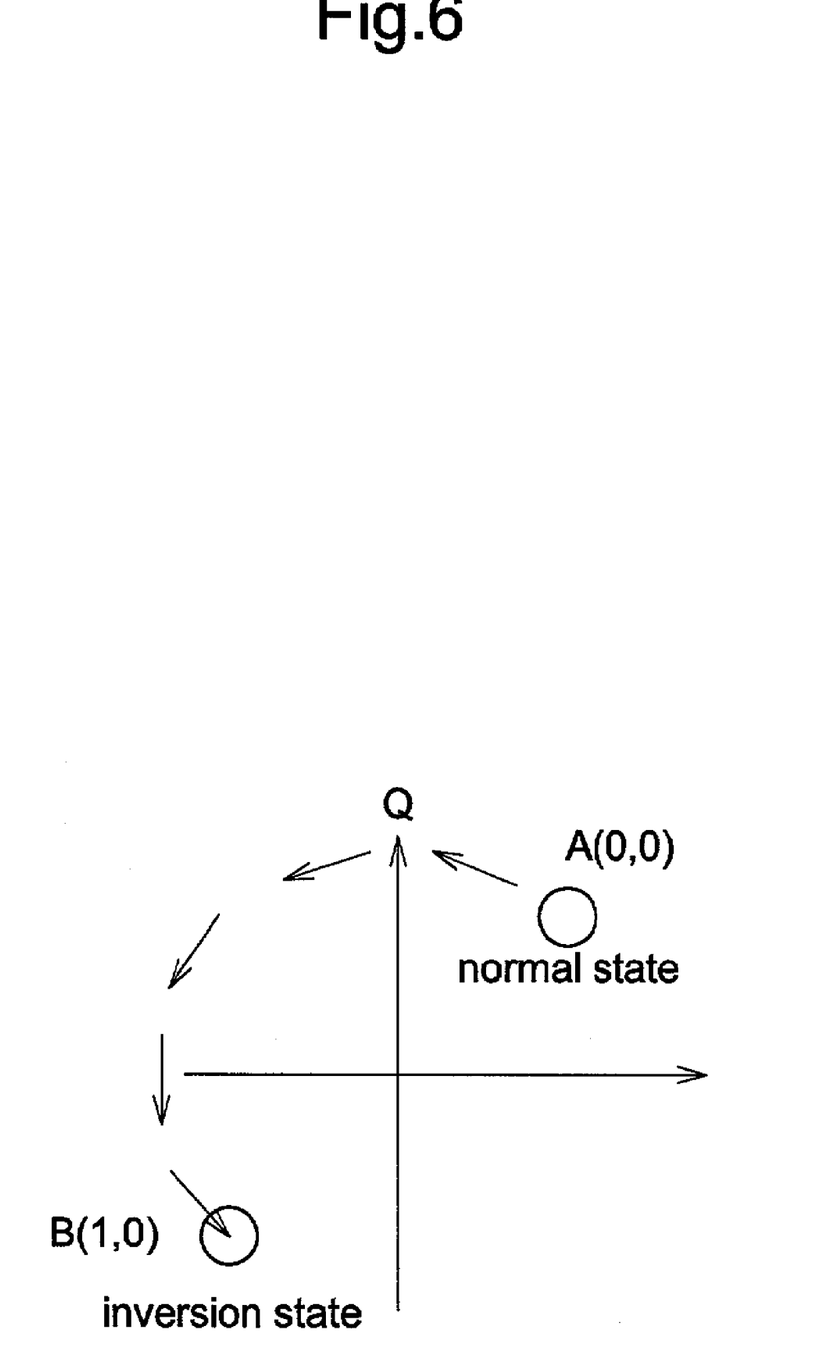
FIG. 6 illustrates coordinate data on an I-Q plane for normal situation when data is transmitted with specific sub-carriers and when a re-initialization request is made, in the ADSL modem according to the first embodiment of the present invention.

FIG. 6 illustrates coordinate data on an I-Q plane for normal situation when data is transmitted with specific sub-carriers and when a re-initialization request is made. In FIG. 6, coordinate data shows transmission data of a sub-carrier for inbound signals, i.e., sub-carrier specified by Remote Side (carrier index #16).

After starting a data communication, Remote Side transmits the coordinate data of (0, 0) at point A with the sub-carrier of carrier index #16 during the normal time (when re-initialization is not necessary).

When a re-initialization is needed during the data communication, Remote Side changes the coordinate data from point A to B (1, 0), which is transmitted by the sub-carrier of carrier index #16.

When a reverse Fourier conversion process is performed for the coordinate data, the sub-carrier topology of carrier index #16 is inverted, upon transmitting the coordinate data of A and B. ADSL modem 105 of the present invention uses these characteristics and requests Center Side for re-initialization.

In this embodiment, sub-carriers of carrier indexes #16 and #48 are the specified sub-carriers for inbound and outbound signals respectively. However, other sub-carriers of different carrier indexes can be selected as the specific sub-carriers.

It is preferable, however, to specify sub-carriers of lower frequency as much as possible, among the sub-carriers for inbound and outbound signals, since the decay rate for a sub-carrier with a low frequency is lower than a sub-carrier with a high frequency.

Figure 7:
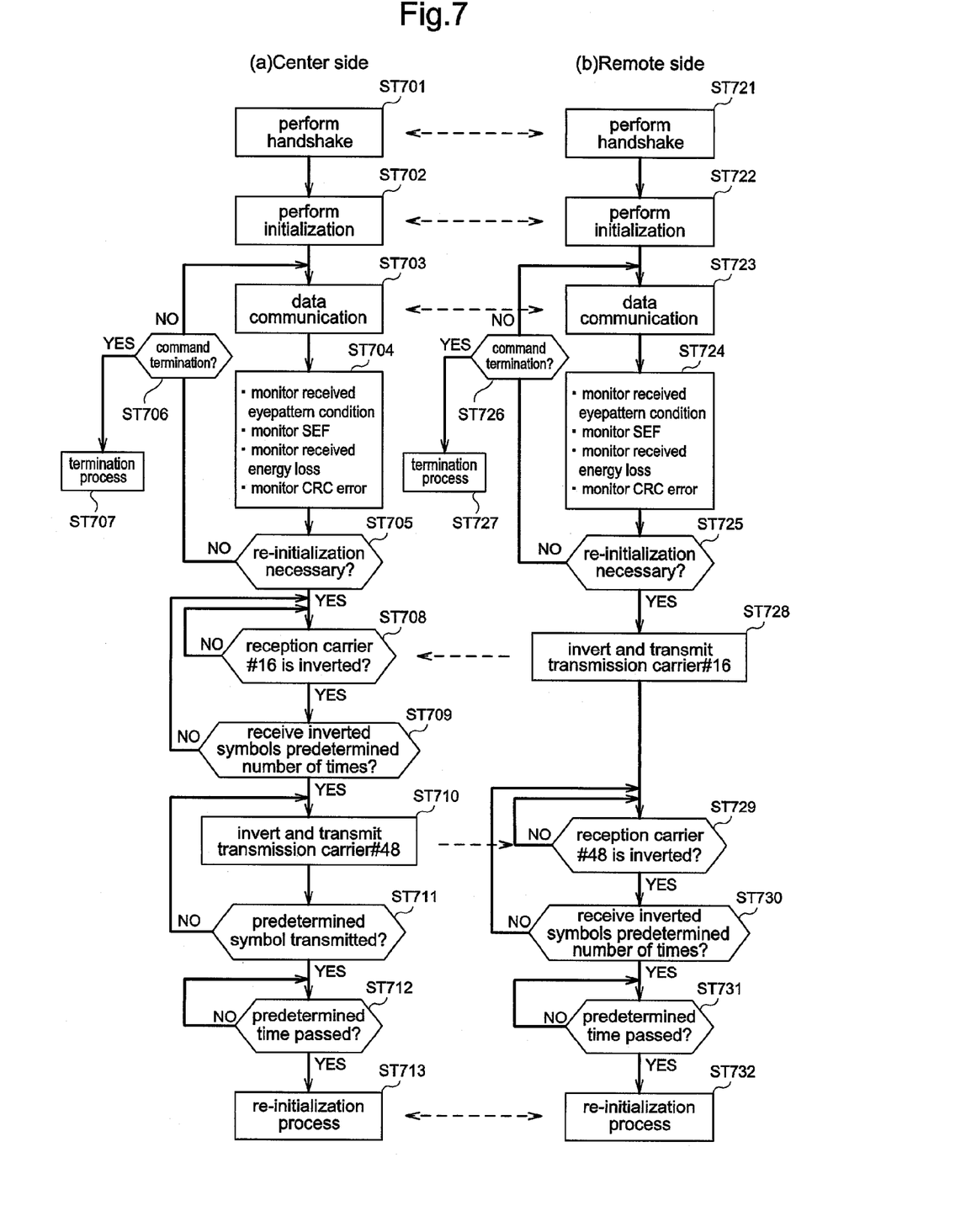
FIG. 7 is a flowchart illustrating the operation of the ADSL modem according to the first embodiment of the present invention.

FIG. 7 is hereafter used to illustrate the operation of the ADSL modem according to the first embodiment of the present invention, by referring to the timing chart of FIGS. 3 and 4. FIG. 7 is a flowchart illustrating the operation of the ADSL modem according to the first embodiment of the present invention. FIG. 7 (*a*) illustrates the operational flow of Center Side, while FIG. 7 (*b*) illustrates the operational flow of Remote Side.

As explained in FIG. 3, both Center and Remote Sides first perform a handshake (Steps 701 and 721) and exchange each other's identifying information upon starting a data communication. At this time, ADSL modem 105 of the first embodiment exchanges functional information that the modem is installed with a re-initialization function and necessary information for performing the re-initialization function. In this context, necessary information for performing the re-initialization function includes carrier indexes of specific sub-carriers.

Upon completing a handshake, an initialization is performed as described in FIGS. 3 and 4 (Steps 702 and 722), and transmission speed used in the data communication and additive information such as sub-carriers used in the data communication, and data amount (bit number) allocated to each sub-carrier for the actual data communication are set.

Upon completing the initialization, the data communication is started (Steps 703 and 723). When the data communication is started, eye patterns, SEF, and energy loss and CRC errors detected from the received data from the other side are monitored (Steps 704 and 724). Specifically, an error is detected when the radius of eye pattern distribution is bigger than a predetermined value. Also, during monitoring of SEF, whether an SF (sink frame) is correctly received with a normal eye pattern is checked. Further, whether the received data is received with more energy than a predetermined value. Furthermore, whether the CRC bit added at the front of the Super frame (data communication unit) shows an error is checked.

According to the monitoring result of the eye patterns or the like, which is detected from the received data, the need for a re-initialization is determined (Steps 705 and 725). That is, the need for the re-initialization is determined and the re-initialization is performed in the situations when the radius of the eye pattern distribution is bigger than the predetermined value, SF is not normally received, received data has lower energy than the predetermined value, or CRC bit shows an error. The need for re-initialization is determined even when the current communication status is overly optimal, in addition to when it is difficult to maintain the current communication status. This is because, when the current communication status is overly optimal, it can be assumed that communication status has improved since the data communication has been started, and data communication is achieved according to the most current communication status by performing the re-initialization.

If the re-initialization is not needed, whether there is a command to terminate the data communication is checked (Steps 706 and 726), and the control returns Steps 703 and 723 to continue the data communication, if there is no command. If there is a command to terminate the data communication, the termination process begins (Steps 707 and 727).

When re-initialization is needed at both Center and Remote Sides, Remote Side transmits a symbol with an inverting sub-carrier topology (topology-inverting symbol), which corresponds to a specific sub-carrier with carrier index #16 (Step 728). Center Side on the other hand monitors whether the sub-carrier topology with carrier index #16 coming from Remote Side is inverted (Step 708).

If the sub-carrier topology with carrier index #16 is inverted, Center Side checks whether the same topology-inverting symbols have been detected a predetermined number of times (Step 709).

If the topology-inverting symbol of the sub-carrier with carrier index #16 has not been received at Step 708, or the same topology-inverting symbols of the sub-carrier with carrier index #16 have not been detected the predetermined number of times at Step 709, Center Side continues to monitor the detection of the topology-inverting symbols of the sub-carrier with carrier index #16.

If the same topology-inverting symbols have been detected the predetermined number of times, Center Side starts a transmission of a topology-inverting symbol, which corresponds to a specific sub-carrier with carrier index #48 (Step 710). Then, whether the same topology-inverting symbols have been transmitted a predetermined number of times (Step 711), and the process of Step 710 is repeated until the symbols have been transmitted the predetermined number of times.

After transmitting topology-inverting symbols of the sub-carrier with carrier index #16 at Step 728, Remote Side monitors the reception of the topology-inverting symbols of the sub-carrier with carrier index #48 from Center Side (Step 729).

Upon receiving the topology-inverting symbol of the sub-carrier with carrier index #48, Remote Side checks whether the same topology-inverting symbols have been received a predetermined number of times (Step 730).

If the topology-inverting symbol of the sub-carrier with carrier index #48 has not been received at Step 729, or the same topology-inverting symbols of the sub-carrier with carrier index #48 have not been detected the predetermined number of times at Step 730, Remote Side continues to monitor the reception of the topology-inverting symbols of the sub-carrier with carrier index #48.

If the topology-inverting symbols of the sub-carrier with carrier index #48 are transmitted the predetermined number of times at Step 711, Center Side monitors a predetermined time period passing since the completion of the transmission (Step 712).

When the topology-inverting symbols of the sub-carrier with carrier index #48 have been received the predetermined number of times at Step 730, Remote Side monitors a predetermined time period passing since the completion of the reception (Step 731). The predetermined time period is monitored in order to synchronize Center and Remote sides for performing the re-initialization.

When the predetermined time periods have passed at Steps 712 and 731, both Center and Remote Sides proceeds to the re-initialization process (Steps 713 and 732).

Figure 8:
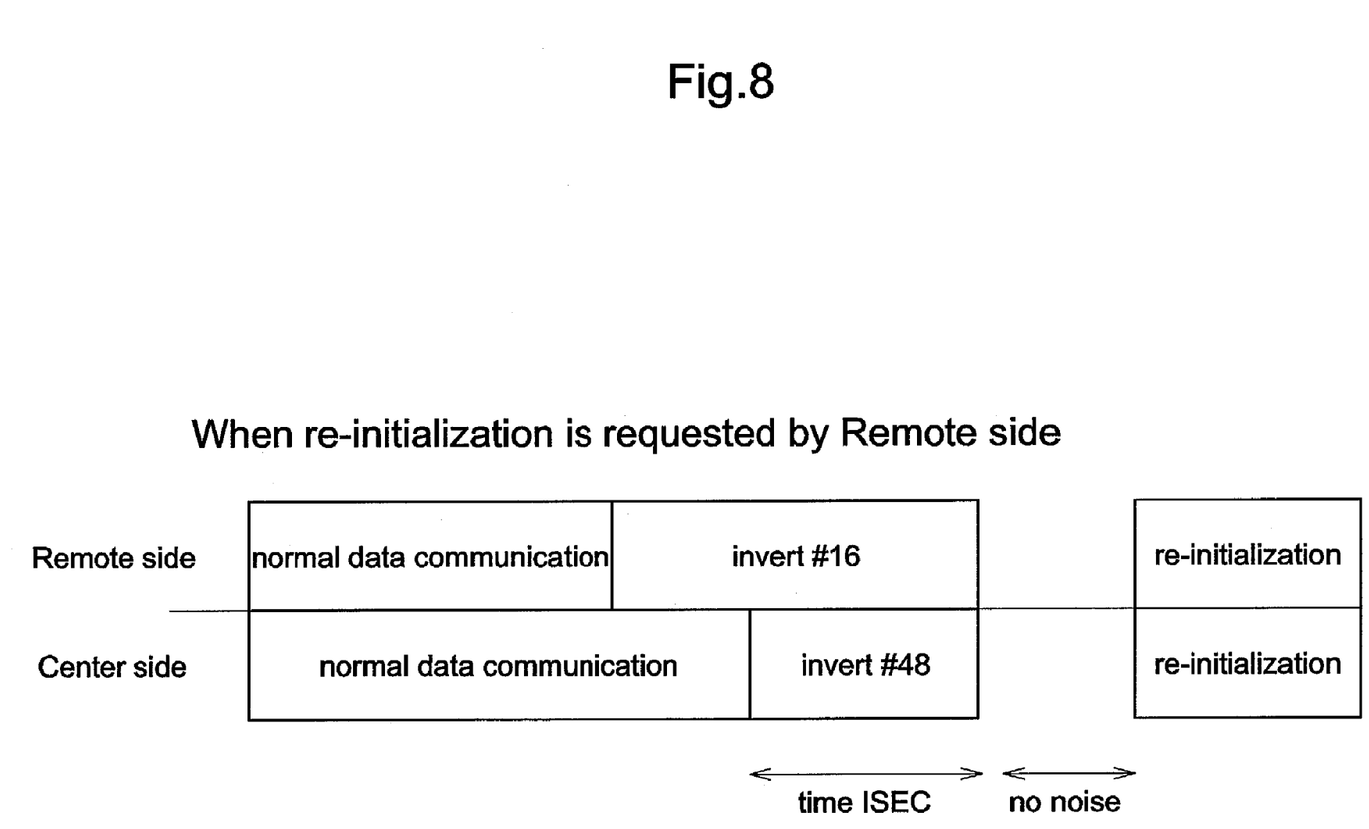
FIG. 8 is a sequence chart illustrating timings for re-initialization process of the ADSL modem according to the first embodiment of the present invention.

FIG. 8 is a sequence chart illustrating timings for re-initialization process of the ADSL modem according to the first embodiment of the present invention.

As shown in FIG. 8, if a need arises to perform the re-initialization during the normal data communication between Center and Remote Sides, Remote Side first transmits a topology-inverting symbol of the specific sub-carrier with carrier index #16 in order to notify Center Side of the request for the re-initialization.

Upon receiving the topology-inverting symbols of the sub-carrier with carrier index #16 the predetermined number of times, Center Side subsequently transmits the topology-inverting symbol of the specific sub-carrier with carrier index #48 in order to reply to the request of the re-initialization.

As shown in FIG. 8, upon transmitting the topology-inverting symbols for the sub-carrier with carrier index #48 the predetermined number of times (e.g., one second) at Center Side, and upon receiving the topology-inverting symbols for the sub-carrier with carrier index #48 the predetermined number of times at Remote Side, both Center and Remote Sides wait for an expiration of a predetermined time with no noise, and moves to the re-initialization process. Accordingly, it is possible to synchronize both Center and Remote Sides to perform the re-initialization.

According to the ADSL modem of the first embodiment, the eye pattern conditions or the like detected from the received data generating from the partner ADSL modem are monitored in order to determine the need for the re-initialization. When it is determined that the re-initialization is necessary, the re-initialization is requested from either Center or Remote Side transmitting an inverted topology of a specific carrier. In response to this re-initialization request, the other side replies by inverting a topology of a specific sub-carrier so that both sides recognize the need for the re-initialization. Likewise, the re-initialization is performed and the communication conditions for the data communication are reset. Accordingly, data communication is performed according to the most current change in communication status that has occurred after the data communication is started, by setting the communication conditions according to the most recent communication status.

In this embodiment, Remote Side first transmits the inverted topology of a specific sub-carrier when the re-initialization is needed, and Remote Side responds similarly by transmitting the inverted topology of a specific sub-carrier. However, this invention is not exclusive to the above description, and Center Side can first transmit the inverted topology of the specific sub-carrier, followed by Remote Side responding by transmitting the inverted topology of the specific sub-carrier, which is the opposite order of the present embodiment. Even with the above changes, it is possible to have the same effect as the present embodiment.

Additionally, in the explanation of present embodiment, both Center and Remote Sides recognize the need for the re-initialization, when either one of the sides transits an inverted topology of a specific sub-carrier to request the re-initialization, and the other side replies by inverting a topology of a specific sub-carrier in response to this request. However, one side receiving the request for the re-initialization may perform the re-initialization, without necessarily replying to the request. Still, in order to perform a reliable re-initialization control, it is preferable to reply to the re-initialization request.

SECOND EMBODIMENT

In the ADSL modem of the first embodiment, sub-carriers are specified in advance, sub-carrier topologies are checked, and both Center and Remote Sides recognize the need for re-initialization. In the ADSL modem of the second embodiment, however, sub-carriers are not specified, but selected according to the communication status determined at the initialization, and sub-carrier topologies are checked and both Center and Remote Sides recognize the need for re-initialization.

Figure 9:
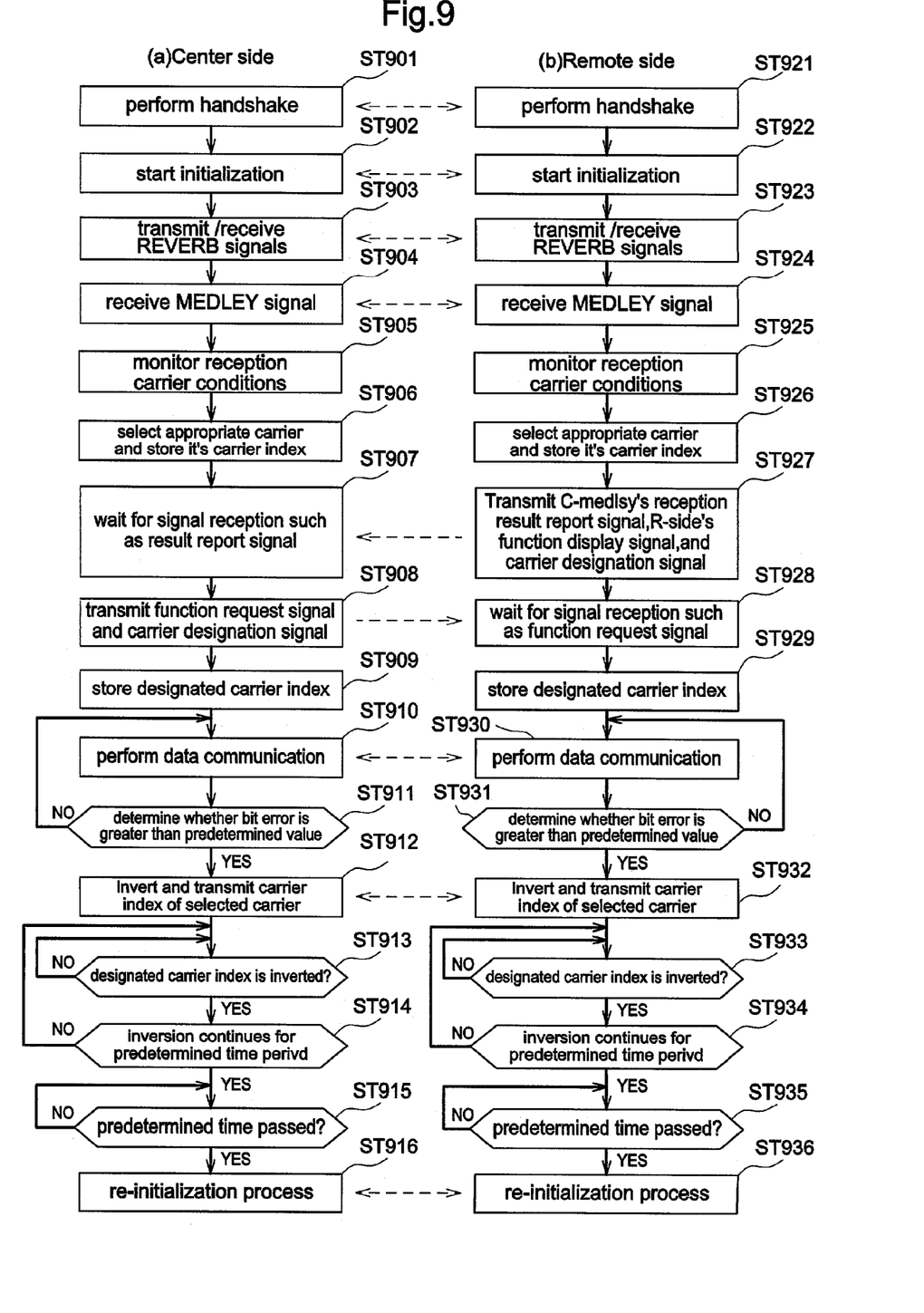
FIG. 9 is a flowchart illustrating the operation of the ADSL modem according to the second embodiment of the present invention.

The ADSL modem of the second embodiment has the same configuration as the ADSL modem of the first embodiment, however, the control for performing a data communication is different. FIG. 9 is a flowchart illustrating the operation of the ADSL modem according to the second embodiment. FIG. 9 (a) is an operational flow of Center Side, and FIG. 9 (b) is an operational flow of Remote Side.

Upon starting a data communication similar to the process of the ADSL modem of the first embodiment, both Center and Remote Sides perform a handshake (Steps 901 and 921) in order to exchange their identifying information or the like. Similar to the ADSL modem of the first embodiment, information that the re-initialization function is installed and information that is necessary for performing the re-initialization is exchanged.

Unlike the ADSL modem of the first embodiment that exchanges carrier index information of specific sub-carriers, the ADSL modem of the second embodiment exchanges information that a sub-carrier to transmit identifying data can be selected dynamically as necessary information to perform a re-initialization.

Upon completing the handshake, an initialization begins (Steps 902 and 922). When the initialization is started, multiple REVERB signals ("R-REVERB1", "R-REVERB2", "R-REVERB3" "C-REVERB1", "C-REVERB2", and "C-REVERB3") are transmitted/received between Center and Remote Sides (Steps 903 and 923) as shown in FIG. 3.

The REVERB signals are configured only with signal energies with no data, and have frequency characteristics given to signal energy of the same energy amount given to sub-carriers, which are aligned up till 1,104 KHz at every 4.3125 KHz. Therefore, the REVERB signals are preferable signals to be used to check the conditions of communication lines. These REVERB signals are also used in the ADSL modem of the first embodiment, however, the explanation of the same has been omitted because they do not perform a special process in the first embodiment.

Upon completing the transmission/reception of the REVERB signals, Center and Remote Sides separately receive MEDLEY signals that are transmitted from the other sides (Steps 904 and 924). By exchanging these following MEDLEY signals, "C-RATES2", "R-RATES2", "C-MSG2", and "R-MSG2", which have been described above, determine the parameter of the communication conditions.

Upon receiving the MEDLEY signal, the ADSL modem of the second embodiment monitors the communication status of each sub-carrier, by checking the data amount allocated to each sub-carrier at the initialization process (Steps 905 and 925).

Then, a sub-carrier appropriate for making a re-initialization request/reply is selected according to the communication status of each sub-carrier, and the carrier index of the sub-carrier is separately stored at Center and Remote Sides (Steps 906 and 926).

Upon storing the carrier index of the sub-carrier that is appropriate for making a re-initialization request/reply at Step 926, Remote Side transmits a signal reporting the reception result in response to the MEDLEY signal (C-MEDLEY) transmitted from Center Side (reception result report signal), signal displaying the function of Remote Side (function display signal), and a signal designating the carrier index of the sub-carrier, which is stored in advance (carrier designation signal) to Center Side (Step 927).

After storing the carrier index of the sub-carrier that is appropriate for a re-initialization request/reply at Step 906, Center Side waits for signals such as the reception result report signal from Remote Side in response to the MEDLEY signal (Step 907).

Upon receiving the signals such as the reception result report signal from Remote Side in response to the MEDLEY signal, Center Side transmits a signal to request the function of Remote Side (function request signal) and a signal to designate the carrier index of the sub-carrier that is stored in advance (carrier designation signal) (Step 908). Then, Center Side stores the carrier index of the sub-carrier that is designated by Remote Side at Step 907 (Step 909).

Upon transmitting the signals such as the reception result report signal in response to the MEDLEY signal at Step 927, Remote Side waits for the signals such as the function request signal from Center Side (Step 928). Upon receiving the signals such as the function request signal from Center Side, Remote Side stores the carrier index of the sub-carrier that is designated by Center Side (Step 929).

Likewise, when both Center and Remote Sides store the carrier indexes of the sub-carriers designated by both sides, the data communication begins (Steps 910 and 930). Prior to initiating the data communication, similar to the ADSL modem of the first embodiment, transmission speed and additive information such as sub-carriers used for the data communication, and data amount (bit number) allocated to each sub-carrier for the actual data communication are set.

When the data communication is started, both Center and Remote Sides check whether the bit error of the received data is greater than a predetermined value (Steps 911 and 931). Or, another predetermined value different from the above can be set, in order to check whether the bit error is smaller than this predetermined value. If the bit error is smaller than the predetermined value, it means that the communication status is overly optimal. If the current communication status is overly optimal, it is considered that the communication status has improved since when the data communication started. Therefore, re-initialization is performed in this situation as well, and it is possible to achieve the data communication according to the most current communication status.

When the bit error of the received data is greater than the predetermined value, both Center and Remote Sides transmit inverted sub-carrier topology corresponding to the pre-selected carrier index to the other side (Steps 912 and 932).

Upon transmitting the inverted sub-carrier topology corresponding to the selected carrier index, the both Center and Remote Sides monitor whether the sub-carrier topology corresponding to the carrier index designated by the other side is inverted (Steps 913 and 933).

When the sub-carrier topology corresponding to the carrier index designated by the other side is inverted, both Center and Remote Side check whether the reception of the sub-carrier with the inverted topology continues for a predetermined time period (Steps 914 and 934).

If the sub-carrier topology corresponding to the carrier index designated by the other side at Steps 913 and/or 933 is not inverted, or if the reception of the sub-carrier with the inverted topology has not continued for the predetermined time period at Steps 914 and/or 934, both Center and Remote Sides return the process to Steps 913 and/or 933, and continue to monitor whether the sub-carrier topology corresponding to the carrier index designated by the other side is inverted.

If the reception of the sub-carrier with the inverted topology continues for the predetermined time period at Steps 914 and/or 934, both Center and Remote Sides further continues the monitoring of another predetermined time period since the expiration of the predetermined time period (Steps 915 and 935). The second expiration of the predetermined time period is monitored so that Center and Remote Sides can synchronize themselves to perform the re-initialization.

If the predetermined time period expires at Steps 915 and 935, both Center and Remote Sides move to the re-initialization process (Steps 916 and 936).

Likewise, according to the ADSL modem of the second embodiment, subcarriers to make a request/reply for a re-initialization are selected according to the communication status a topology of the selected sub-carrier is inverted and exchanged with the partner ADSL modem, so that both Center and Remote Sides recognize the need for the re-initialization. Accordingly, the re-initialization is performed and communication conditions for the data communication are reset. Therefore, it is possible to perform a data communication according to the most current change in communication status that has occurred after the data communication is started.

Additionally, a sub-carrier that makes a request/reply for a re-initialization is dynamically changed according to the communication status, thus securely preventing a situation where it is impossible to make a request/reply for the re-initialization.

The present invention is not limited to the above-described embodiments, and various variations and modifications may be possible without departing from the scope of the present invention.

This application is based on the Japanese Patent Application No. 2001-276698 filed on Sep. 12, 2001, entire content of which is expressly incorporated by reference herein.

What is claimed is:

1. An ADSL modem apparatus in a transmission side, comprising:
    a monitor that monitors a communication status during a data communication;
    a determiner that determines whether a re-initialization is necessary in the communication status;
    a re-initialization requester that requests a re-initialization to an ADSL modem apparatus in a reception side by inverting a topology of a pre-specified sub-carrier, when a re-initialization is necessary; and
    a re-initialization controller that performs a re-initialization after an expiration of a predetermined time period, upon receiving a reply to the re-initialization request from the ADSL modem apparatus in the reception side.

2. An ADSL modem apparatus in a transmission side, comprising:
    a monitor that monitors a communication status during a data communication;
    a determiner that determines whether a re-initialization is necessary in the communication status; and
    a re-initialization requester that requests a re-initialization to an ADSL modem apparatus in a reception side by inverting a topology of a pre-specified sub-carrier, when a re-initialization is necessary, wherein said determiner determines whether a re-initialization is necessary in the communication status based on an eye pattern that is detected from received data from the ADSL modem apparatus in the reception side.

3. An ADSL modem apparatus in reception side, comprising:
    a monitor that monitors a communication status during a data communication;
    a determiner that determines whether a re-initialization is necessary in the communication status;
    a re-initialization replier that replies to a re-initialization request by inverting a topology of a pre-specified sub-carrier upon receiving a re-initialization request from an ADSL modem apparatus in a transmission side when the re-initialization is necessary; and
    a re-initialization controller that performs a re-initialization after an expiration of a predetermined time period, upon replying to the re-initialization request.

4. An ADSL modem apparatus in reception side, comprising:
    a monitor that monitors a communication status during a data communication;
    a determiner that determines whether a re-initialization is necessary in the communication status; and
    a re-initialization replier that replies to a re-initialization request by inverting a topology of a pre-specified sub-carrier upon receiving a re-initialization request from an ADSL modem apparatus in a transmission side when the re-initialization is necessary, wherein said determiner determines whether the re-initialization is necessary in the communication status based on an eye pattern that is detected from received data from the ADSL modem apparatus in the transmission side.

5. An ADSL modem apparatus, comprising:
    a memory that stores a first sub-carrier selected for re-initialization control prior to starting a data communication, and second sub-carrier designated for the re-initialization control by an ADSL modem apparatus in other side;
    a monitor that monitors communication status during a data communication;
    a determiner that determines whether a re-initialization is necessary in the current communication status;
    a re-initialization requester that requests a re-initialization to the ADSL modem apparatus in other side by inverting a topology of the first sub-carrier when the re-initialization is necessary; and
    a re-initialization controller that performs a re-initialization after an expiration of a predetermined time period, upon detecting an inverted topology of the second sub-carrier.

6. A re-initialization method, comprising:
monitoring communication status during a data communication;
determining whether a re-initialization is necessary in the current communication status;
requesting a re-initialization to an ADSL modem apparatus in reception side by inverting a topology of a pre-specified sub-carrier when the re-initialization is necessary; and
performing a re-initialization after an expiration of a predetermined time period, upon receiving a reply to the re-initialization request from the ADSL modem apparatus in the reception side.

7. A re-initialization method, comprising:
monitoring communication status during a data communication;
determining whether a re-initialization is necessary in the current communication status;
replying to a re-initialization request by inverting a topology of a pre-specified sub-carrier upon receiving the re-initialization request from an ADSL modem apparatus in a transmission side when the re-initialization is necessary; and performing a re-initialization after an expiration of a predetermined time period, upon replying to the re-initialization request.

8. A re-initialization method, comprising:
storing a first sub-carrier selected for re-initialization control prior to starting a data communication, and second sub-carrier designated for the re-initialization control by an ADSL modem apparatus in other side;
monitoring communication status during a data communication;
determining whether a re-initialization is necessary in the current communication status;
requesting a re-initialization to the ADSL modem apparatus in other side by inverting a topology of the first sub-carrier when the re-initialization is necessary; and
performing a re-initialization after an expiration of a predetermined time period, upon detecting an inverted topology of the second sub-carrier.

* * * * *